US008095780B2

(12) United States Patent  
Leijten

(10) Patent No.: US 8,095,780 B2  
(45) Date of Patent: Jan. 10, 2012

(54) REGISTER SYSTEMS AND METHODS FOR A MULTI-ISSUE PROCESSOR

(75) Inventor: Jeroen Anton Johan Leijten, Eindhoven (NL)

(73) Assignee: Nytell Software LLC, Wilmington, DE (US)

( * ) Notice: Subject to any disclaimer, the term of this patent is extended or adjusted under 35 U.S.C. 154(b) by 148 days.

(21) Appl. No.: 10/511,512

(22) PCT Filed: Apr. 1, 2003

(86) PCT No.: PCT/IB03/01366  
§ 371 (c)(1),  
(2), (4) Date: Oct. 14, 2004

(87) PCT Pub. No.: WO03/088038  
PCT Pub. Date: Oct. 23, 2003

(65) Prior Publication Data  
US 2005/0132170 A1 Jun. 16, 2005

(30) Foreign Application Priority Data  
Apr. 18, 2002 (EP) .................................. 02076525

(51) Int. Cl.  
*G06F 7/38* (2006.01)  
*G06F 9/00* (2006.01)  
*G06F 9/44* (2006.01)  
(52) U.S. Cl. ........................ 712/220; 712/215  
(58) Field of Classification Search .............. 712/229, 712/215, 20, 244; 711/117  
See application file for complete search history.

(56) References Cited

U.S. PATENT DOCUMENTS

| | | | | |
|---|---|---|---|---|
| 4,594,655 A | * | 6/1986 | Hao et al. | 712/218 |
| 5,274,831 A | | 12/1993 | Katsuta | |
| 5,452,401 A | | 9/1995 | Lin | |
| 5,832,202 A | | 11/1998 | Slavenburg et al. | |
| 5,909,565 A | | 6/1999 | Morikawa et al. | |
| 6,026,479 A | * | 2/2000 | Fisher et al. | 712/24 |
| 6,122,722 A | * | 9/2000 | Slavenburg | 712/24 |
| 6,192,384 B1 | * | 2/2001 | Dally et al. | 708/200 |

(Continued)

FOREIGN PATENT DOCUMENTS

DE   100 08 008 C1   8/2001

(Continued)

OTHER PUBLICATIONS

Wu, "Power Analysis of Gated Pipeline Registers", ASIC/SOC Conf., IEEE, pp. 281-285 (Sep. 1999).

(Continued)

*Primary Examiner* — Eddie P Chan  
*Assistant Examiner* — George Giroux  
(74) *Attorney, Agent, or Firm* — McAndrews, Held & Malloy, Ltd.

(57) ABSTRACT

A multi-issue processor includes a register file and a plurality of issue slots, each one of the plurality of issue slots having a plurality of functional units and a plurality of holdable registers. The plurality of issue slots include a first set of issue slots and a second set of issue slots, and the register file is accessible by the plurality of issue slots. A location of at least a part of the plurality of holdable registers in the first set of issue slots is different from a location of at least a corresponding part of the plurality of holdable registers in the second set of issue slots.

17 Claims, 3 Drawing Sheets

U.S. PATENT DOCUMENTS

| | | |
|---|---|---|
| 6,317,820 B1 | 11/2001 | Shiell et al. |
| 6,510,510 B1 * | 1/2003 | Garde .................. 712/218 |
| 6,745,336 B1 * | 6/2004 | Martonosi et al. ........... 713/340 |
| 2001/0049781 A1 | 12/2001 | Miyake et al. |
| 2002/0108026 A1 * | 8/2002 | Balmer et al. .............. 712/218 |

FOREIGN PATENT DOCUMENTS

| | | |
|---|---|---|
| JP | 8-305568 A | 11/1996 |
| JP | 2001-243066 A | 9/2001 |
| WO | 00/26772 A1 | 5/2000 |
| WO | WO0033178 A1 * | 6/2000 |
| WO | WO 0033178 A1 * | 6/2000 |

OTHER PUBLICATIONS

Moon, "A 32-bit RISC Microprocessor With DSP Functionally: Rapid Prototyping", IEICE Trans. on Funds. of Electronics, Communications and Computer Sciences, vol. E84-A, No. 5, pp. 1339-1347 (May 2001).

* cited by examiner

REGISTER SYSTEMS AND METHODS FOR A MULTI-ISSUE PROCESSOR

TECHNICAL FIELD

The present invention relates to a multi-issue processor comprising: a plurality of issue slots, each one of the plurality of issue slots comprising a plurality of functional units and a plurality of holdable registers, the plurality of issue slots comprising a first set of issue slots and a second set of issue slots; and a register file accessible by the plurality of issue slots.

BACKGROUND ART

Multi-issue processors exhibit a lot of parallel hardware to enable the concurrent execution of multiple operations in a single processor cycle and thus exploiting instruction-level parallelism in programs. Examples of multi-issue processors are VLIW (Very Large Instruction Word) processors and superscalar processors. In case of a VLIW processor, the software program contains full information regarding which operations should be executed in parallel and these operations are packed into one very long instruction. The compiler ensures that all dependencies between operations are respected and that no resource conflicts can occur. Apart from this program information the hardware does not require any additional information to correctly execute the program, which results in relatively simple hardware. In case of a superscalar processor the software to be executed is presented as a program composed of a sequential series of operations. The processor hardware itself determines at runtime which operation dependencies exist and decides which operations to execute in parallel based on these dependencies, while ensuring that no resource conflicts will occur. A relatively simple compiler suffices for translating a high-level programming language to sequential code, but the processor hardware is very complex.

In multi-issue processors, the parallel hardware responsible for executing these operations is organized in issue slots. Each issue slot contains one or more functional units that perform the actual operations. Commonly, in every processor cycle a single operation is started on one functional unit in every issue slot. In some processors more than one functional unit is put in an issue slot as a trade-off between maximum available parallelism and instruction width cost, in case of a VLIW processor, or hardware complexity, in case of a superscalar processor.

Since in each clock cycle at most one operation can be started on one functional unit in each issue slot, power may be wasted by functional units in that issue slot that are not being used in a given processor cycle. If the input of these functional units changes during the time that they are not used they will still consume comparable power to when they are being used, even though their output is irrelevant.

This waste of power can be eliminated by putting holdable registers, i.e. a register, the state of which remains unchanged in case of a different input, at the inputs of all functional units within an issue slot. These holdable registers will leave the inputs of the functional units unchanged, when these functional units are not being used. Since the inputs of these functional units remain unchanged, no combinatorial gates are switched and no dynamic power dissipation occurs. These holdable registers can be implemented, for example, by means of clock gating. Another advantage of these registers is that the additional pipeline stage they are forming allows running the processor at a higher clock frequency. A disadvantage of adding registers to all inputs of functional unit inputs is that it increases the amount of state that must be saved during interrupts. An interrupt allows a processor to quickly respond to external events and it causes the processor to temporarily postpone the further execution of the current program trace and instead perform another trace. The state of the postponed trace must be saved such that, when the interrupt has been serviced, the processor can restore its original state and can correctly proceed with the original trace. In order to obtain a predictable and short interrupt latency, it must always be possible to interrupt the processor whenever desired. This is especially important in real-time applications. Interrupting a processor at an arbitrary point in the program can imply that a significant amount of state must be saved.

The non-prepublished European patent application 00203591.3 [attorneys' docket PHNL000576], filed on 18 Oct. 2000, provides a solution for decreasing the amount of state that must be saved during interrupts. A second compact instruction set is applied, that is used in an interrupt service routine and only uses a limited set of processor resources. In case of an interrupt, it is sufficient to save the state of only the limited set of processor resources used by the second compact instruction set, while simply freezing the state in all other resources. However, the resources used by the second compact instruction set still have a considerable amount of state that must be saved and restored during interrupts, when registers are put at all the inputs of each functional unit in this limited set of resources.

DISCLOSURE OF INVENTION

An object of this invention is to provide a solution to further reduce the amount of state that must be saved during interrupt handling for multi-issue processors, while maintaining a significant reduction in power consumption and improved performance.

This object is achieved with a multi-issue processor of the kind set forth characterized in that a location of at least a part of the plurality of holdable registers in the first set of issue slots is different from a location of at least a corresponding part of the plurality of holdable registers in the second set of issue slots.

Ideally, the holdable registers are put at all inputs of each functional unit within an issue slot. In that case it is guaranteed that each input of a functional unit, that is not being used, will remain unchanged and no unnecessary power dissipation will occur. However, this increases the amount of state that has to be saved during interrupt handling. By varying the position of the holdable registers for different issue slots, and not putting a holdable register in front of all inputs of every functional unit, less state saving is required during interrupt handling. This may result in a lower reduction of the power consumption or a reduced increase in performance. Depending on the type of application an optimal choice between these demands can be made.

An embodiment of the invention is characterized in that the multi-issue processor further comprises a first instruction set means having access to the first set of issue slots and a second instruction set means having access to the second set of issue slots. An advantage of this embodiment is that the location of the holdable registers in an issue slot can be made dependent of the instruction set means that controls this issue slot. If the second instruction set means is used in an interrupt service routine, the holdable registers in the second set of issue slots can be positioned to optimally reduce the amount of state that must be saved during interrupt handling. However, this solution is not optimal for reduction of the power consumption.

The positioning of the holdable registers still creates an additional pipeline stage enabling an increase in the clock frequency of the processor. Many interrupts require very simple interrupt service routines and therefore a compact second instruction set using a limited set of issue slots is sufficient. Therefore the non-optimal reduction in power consumption only holds for a small set of issue slots within the multi-issue processor. The first set of issue slots is not used during interrupt handling and as a result their state does not have to be saved. The holdable registers can be placed to optimally reduce the power consumption and increasing the clock frequency by creating an additional pipeline stage. For the overall processor this results in a well-balanced consideration between increasing performance, decreasing power consumption and reducing state saving overhead.

An embodiment of the invention is characterized in that in the first set of issue slots the location of the plurality of holdable data registers is at individual data inputs of the functional units, while in the second set of issue slots the location of the plurality of holdable data registers is at common data inputs of the functional units. An advantage of this embodiment is that the amount of state that has to be saved during interrupt handling is strongly reduced, since the holdable registers are not positioned at all individual inputs of the functional units of the second set of issue slots, but only at their common inputs. However, the use of one functional unit of an issue slot of the second set of issue slots results in changing inputs at the other functional units of that issue slot and therefore causes unnecessary power dissipation. In case that entire issue slot is not being used, the functional units will consume no power. In the first set of issue slots the holdable registers are positioned at all inputs of the functional units to optimally reduce power consumption, resulting in a significant overall reduction in the power consumption. Furthermore, the holdable registers in the first and second set of issue slots form an additional pipeline stage in the architecture, allowing the processor to run at a higher clock frequency. As a result, a good compromise is obtained between reduction in power consumption, increase in performance and reduction in the amount of state that has to be saved during interrupt handling.

BRIEF DESCRIPTION OF THE DRAWINGS

The features of the described embodiments will be further elucidated and described with reference to the drawings.

DESCRIPTION OF PREFERRED EMBODIMENTS

Figure 1:
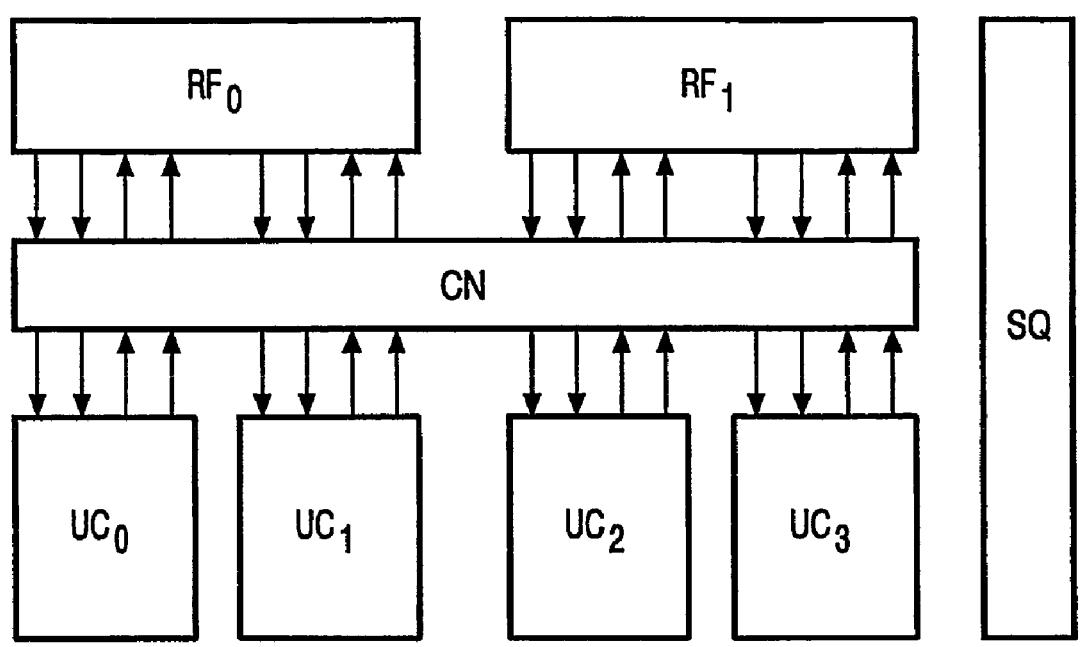
FIG. 1 is a schematic diagram of a VLIW processor.

Referring to FIG. 1, a schematic block diagram illustrates a VLIW processor comprising a plurality of issue slots, including issue slots, $UC_0$, $UC_1$, $UC_2$ and $UC_3$, and a distributed register file including register file segments $RF_0$ and $RF_1$. The processor has a controller SQ and a connection network CN for coupling the register file segments $RF_0$ and $RF_1$, and the issue slots $UC_0$, $UC_1$, $UC_2$ and $UC_3$. The issue slots $UC_0$, $UC_1$, $UC_2$ and $UC_3$ are used by a first instruction set and this first instruction set includes the normal VLIW instructions. The issue slot $UC_0$ is the only issue slot that is used by a second instruction set. This second instruction set is used in an interrupt service routine.

Figure 2:
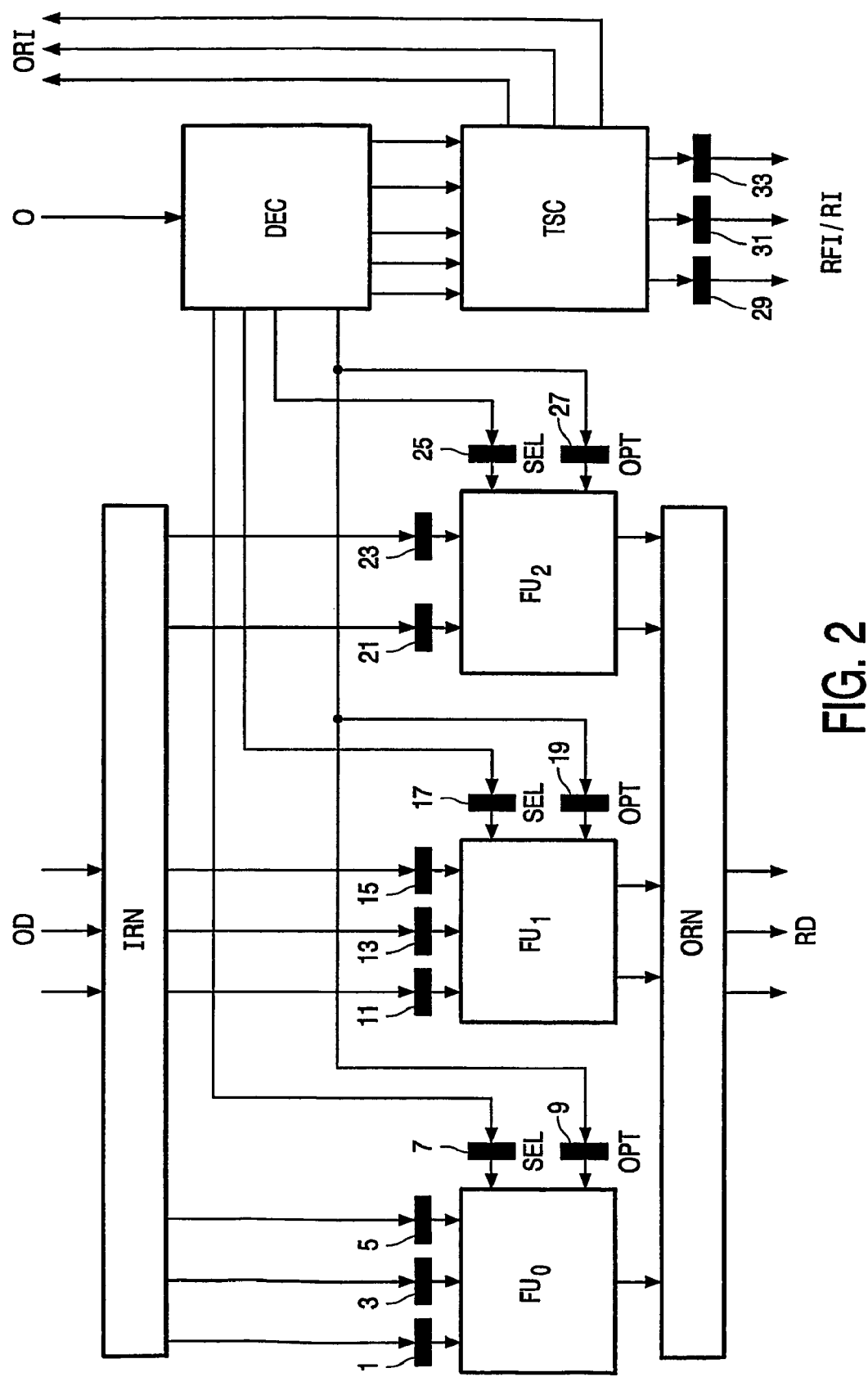
FIG. 2 is a schematic diagram of issue slot $UC_1$, $UC_2$ and $UC_3$ only used by a first instruction set.
Figure 3:
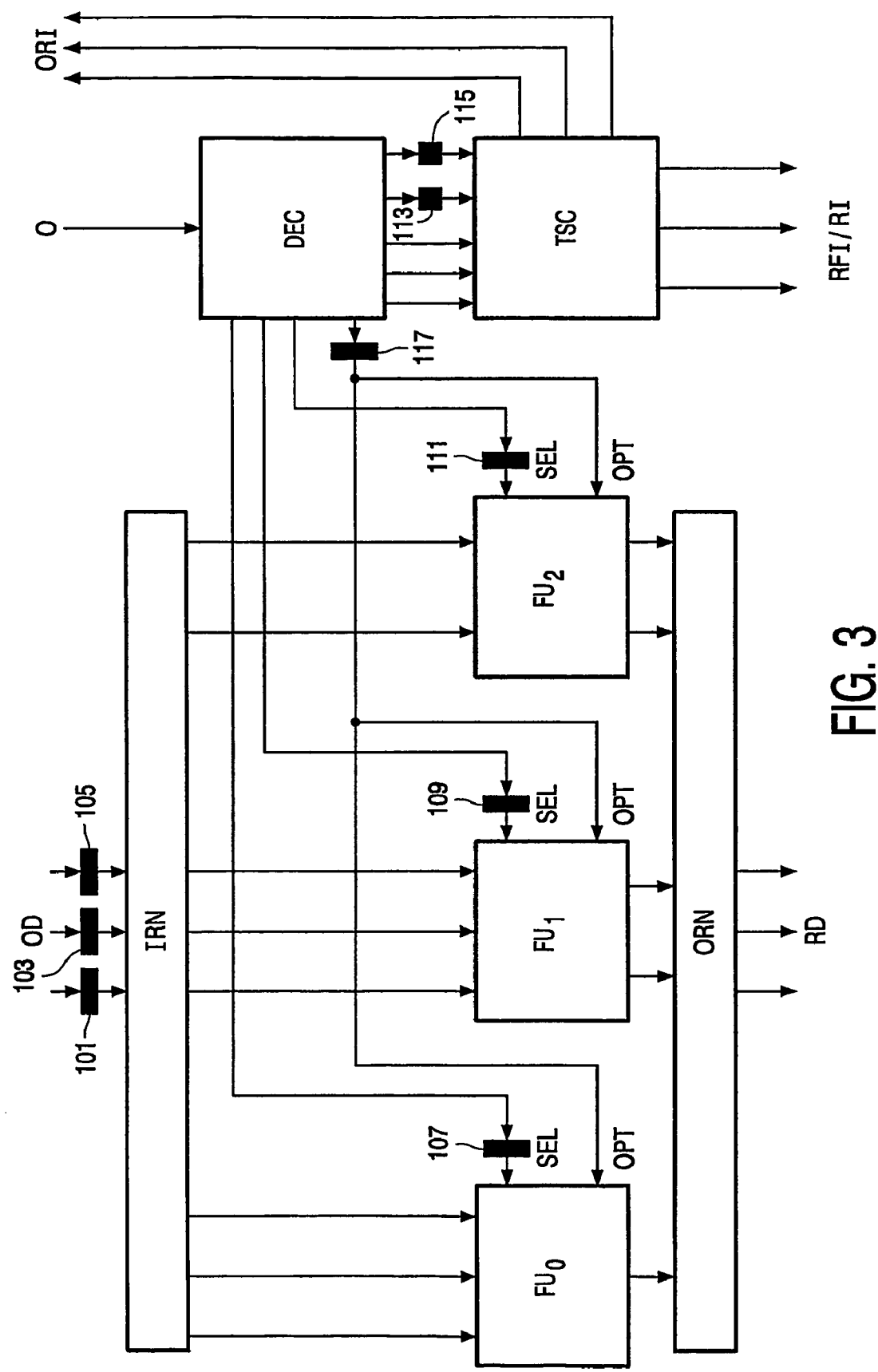
FIG. 3 is a schematic diagram of issue slot $UC_0$ used by a second instruction set, during interrupt handling.

Referring to FIG. 2, a schematic block diagram illustrates issue slots $UC_1$, $UC_2$ and $UC_3$. Referring to FIG. 3, a schematic block diagram illustrates issue slot $UC_0$. Referring now to both FIG. 2 and FIG. 3, each issue slot comprises a decoder DEC, a time shape controller TSC, an input routing network IRN, an output routing network ORN, and a plurality of functional units, including functional units $FU_0$, $FU_1$ and $FU_2$. The decoder DEC is coupled to the time shape controller TSC and to the functional units $FU_0$, $FU_1$ and $FU_2$. The input routing network IRN is coupled to the functional units $FU_0$, $FU_1$ and $FU_2$. The output routing network ORN is also coupled to the functional units $FU_0$, $FU_1$ and $FU_2$. The decoder DEC decodes the operation O applied to the issue slot in each clock cycle. Results of the decoding step are operand register indices ORI and the decoder DEC passes these indices to the connection network CN, shown in FIG. 1. Further results of the decoding step are result file indices RFI and register indices RI. The decoder DEC passes these indices to the time shape controller TSC. The time shape controller TSC delays the result file indices RFI and the register indices RI by the proper amount, according to the input/output behavior of the functional unit on which the operation must be executed. Subsequently, the time shape controller TSC passes the result file indices RFI and the register indices RI to the connection network CN, shown in FIG. 1. The decoder DEC also selects one of the functional units $FU_0$, $FU_1$ and $FU_2$ to perform an operation, using the coupling SEL. Furthermore, the decoder DEC passes information on the type of operation that has to be performed to the functional units $FU_0$, $FU_1$ and $FU_2$, using the coupling OPT. The input routing network IRN passes the operand data OD for the issue slot $UC_1$, $UC_2$ and $UC_3$ to the inputs of functional units $FU_0$, $FU_1$ and $FU_2$. The functional units $FU_0$, $FU_1$ and $FU_2$ pass their output data to the output routing network ORN and subsequently the output routing network ORN passes the result data RD to the communication network CN, see FIG. 1.

Referring to FIG. 2, holdable registers 1-27 are provided directly at the data and control inputs of the functional units $FU_0$, $FU_1$ and $FU_2$. Holdable registers 1-5, 11-15, 21 and 23 are referred to as holdable data registers, since they are positioned at the data inputs of the functional units $FU_0$, $FU_1$ and $FU_2$. The holdable registers 1-27 will leave the inputs of the functional units $FU_0$, $FU_1$ and $FU_2$ unchanged when a functional unit is not being used. As a result, no combinatorial gates are switched and no power dissipation occurs. Furthermore, to prevent result file indices RFI and register indices RI from changing unnecessarily, and thereby causing unnecessary power dissipation, holdable registers 29, 31 and 33 are placed directly after the time shape controller TSC. An advantage of this embodiment is that it reduces the power consumption. In each clock cycle at most one operation can be started on one of the functional units $FU_0$, $FU_1$ and $FU_2$, and most functional units finish their operation in a single processor cycle. If the inputs of the functional units, that are not being used, change due to data passed via the input routing network IRN or the decoder DEC, these functional units will consume comparable power to when they are not being used, even though their output is irrelevant. Adding the holdable registers 1-33 creates additional state, but that is irrelevant for the issue slots $UC_1$, $UC_2$ and $UC_3$. During interrupts, their state only has to be frozen. The holdable registers 1-33 do only incur additional area. These registers do not waste additional power due to using clock gating to hold the registers in their inactive state in case the corresponding functional unit is not being used.

Referring to FIG. 3, issue slot $UC_0$ is the only issue slot that is used by the second instruction set, used in an interrupt service routine. In order to guarantee a fast interrupt response, it is crucial to minimize the amount of state that has to be saved during interrupt handling. This can be achieved by positioning the holdable registers at common inputs of the functional units $FU_0$, $FU_1$ and $FU_2$. Therefore, holdable registers 101, 103 and 105 are put directly at the input of the issue slot $UC_0$ instead of at the data inputs of each functional unit $FU_0$, $FU_1$ and $FU_2$ in issue slot $UC_0$. Furthermore, a holdable register 117 is put at the output of the decoder DEC for passing information of the type of operation OPT that has to be performed, instead of at the input of each functional unit $FU_0$, $FU_1$ and $FU_2$ in issue slot $UC_0$. At the result file index input and register index input terminals of the time shape controller TSC holdable registers 113 and 115 are positioned as well, instead of at their outputs, saving one holdable register. The positioning of the holdable registers 107, 109 and 111 at the input of each functional unit $FU_0$, $FU_1$ and $FU_2$ remains unchanged, since these functional unit inputs are not coupled to a common output of the decoder DEC.

An advantage of the positioning of the holdable registers in issue slot $UC_0$, is that the amount of state that has to be saved during an interrupt is strongly reduced, when compared to the amount of state present due to the holdable registers in the issue slots $UC_1$, $UC_2$ and $UC_3$. The use of one functional unit $FU_0$, $FU_1$ and $FU_2$ in the issue slot $UC_0$, results in changing inputs at the other functional units of issue slot $UC_0$ and therefore causes unnecessary power dissipation in this issue slot. In case the entire issue slot is not being used, the holdable registers 101-111 and 117 will prevent power consumption by the functional units $FU_0$, $FU_1$ and $FU_2$ of issue slot $UC_0$.

For the issue slots $UC_0$, $UC_1$, $UC_2$ and $UC_3$, the location of the holdable registers results in a well balanced consideration between increasing performance, decreasing power consumption and reducing state overhead. Many interrupts require very simple interrupt service routines and therefore only require a compact second instruction set that uses a limited second set of issue slots. In a large subset of the issue slots the holdable registers can be positioned as indicated in FIG. 2 to optimally reduce the power consumption, resulting in a significant overall reduction of the power consumption. The amount of state that has to be saved during interrupt handling is strongly reduced by positioning the holdable registers in the issue slots, used by the second instruction set, as indicated in FIG. 3. Furthermore, the holdable registers added to the issue slots $UC_0$, $UC_1$, $UC_2$ and $UC_3$ form an additional pipeline stage in the architecture, allowing the processor to run at a higher clock frequency. Referring again to FIG. 1, the holdable registers positioned in issue slots $UC_0$, $UC_1$, $UC_2$ and $UC_3$ divide the existing data path into two parts, decreasing the time needed to execute one part of the data path and allowing to increase the clock frequency of the processor.

A superscalar processor also comprises multiple issue slots that can perform multiple operations in parallel, as in case of a VLIW processor. The principles of the embodiments for a VLIW processor, described in this section, therefore also apply for a superscalar processor. In general, a VLIW processor may have more issue slots when compared to a superscalar processor. The hardware of a VLIW processor is less complicated when compared to a superscalar processor, which results in a better scalable architecture. The number of issue slots and the number of functional units in each issue slot, among other things, will determine the relative decrease in power consumption due to the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually dependant claims does not indicate that a combination of these measures cannot be used to advantage.

The invention claimed is:

1. A multi-issue processor comprising:
a register file; and
a plurality of issue slots, each one of the plurality of issue slots including
a plurality of functional units,
an input routing network that provides multiple data path outputs for a single data path input, the input routing network receiving data from the register file on the single data path input via a single data input path and providing data from the register file to functional units of the plurality of functional units, the data provided on the multiple data path outputs via multiple data output paths, and
a plurality of holdable registers that hold duplicate data from the register file,
wherein in a first set of the plurality of issue slots the holdable registers store data on the multiple data output paths of the first set and the holdable registers in the first set do not store data on the single data input path corresponding to the input routing networks of the first set and in a second set of the plurality of issue slots the holdable registers store data on the single data input path corresponding to the input routing networks of the second set and the holdable registers in the second set do not store data on the multiple data output paths of the second set.

2. A multi-issue processor according to claim 1, wherein
a first instruction set accesses at least the first set of issue slots; and
a second instruction set accesses the second set of issue slots.

3. A multi-issue processor according to claim 1, wherein
the input routing network of each of the plurality of issue slots has a plurality of data path inputs; and
in the second set of issue slots holdable registers of the plurality of holdable registers are located between each of the inputs of the input routing network and the register file.

4. A multi-issue processor according to claim 1, wherein, in the first set of issue slots, holdable registers are located between the input routing networks and each of the plurality of function units.

5. A multi-issue processor according to claim 1, wherein the first set of issue slots are accessed by a first set of instructions for a very-large-instruction-word (VLIW) processor and the second set of issue slots are accessed by a second set of instructions that are used by an interrupt routine.

6. A multi-issue processor according to claim 5, wherein the second set of instructions has less instructions than the first set of instructions.

7. A multi-issue processor according to claim 1, wherein the first set of issue slots has more issue slots than the second set of issue slots.

8. A circuit for use in a computing system having at least one multi-issue processor, with
a register file; and
a plurality of issue slots, each one of the plurality of issue slots including
an input routing network that provides multiple data path outputs for a single data path input, the input routing network receiving data from the register file on the single data path input via a single data input path and providing data from the register file to outputs of functional units, the data provided on the multiple data path outputs via multiple data output paths, and the circuit comprising:
a plurality of holdable registers that hold duplicate data from the register file,
wherein in a first set of the plurality of issue slots the holdable registers store data on the multiple data output paths of the first set and the holdable registers in the first set do not store data on the single data input path corresponding to the input routing networks of the first set and in a second set of the plurality of issue slots the holdable registers store data on the single data input path corresponding to the input routing networks of the second set and the holdable registers in the second set do not store data on the multiple data output paths of the second set.

9. The circuit of claim 8, wherein
a first instruction set accesses at least the first set of issue slots; and
a second instruction set accesses the second set of issue slots.

10. The circuit of claim 8, wherein, in the first set of issue slots, holdable registers are located between the input routing networks and each of the plurality of function units.

11. The circuit of claim 8, wherein the second set of instructions has less instructions than the first set of instructions.

12. The circuit of claim 8, wherein the first set of issue slots has more issue slots than the second set of issue slots.

13. A multi-issue processor comprising:
a register file;
a first set of one or more issue slots, each issue slot including:
a plurality of functional units, the issue slot configured to reduce power usage by preventing switching of combinatorial gates in each respective one of the plurality of functional units during clock cycles when the functional unit is not in use; and
an input routing network having an input path coupled to the register file and having a plurality of output paths coupled to respective ones of the plurality of functional units;
a second set of one or more issue slots, each issue slot including:
a plurality of functional units;
an input routing network having an input path coupled to the register file and having a plurality of output paths coupled to respective ones of the plurality of functional units, the input path including a register coupled to store data on the input path and the output paths not including registers for data storage; and
a controller circuit for controlling which issue slots of the first and second sets of one or more issue slots are used to process respective instructions received by the multi-issue processor, the controller circuit configured to:
in response to determining respective instructions received by the multi issue processor are included in a first instruction set, process the instructions using one or more of at least the first set of one or more issue slots; and
in response to determining respective instructions received by the multi issue processor are included in a second instruction set, process the instructions using only one or more of the second set of one or more issue slots.

14. The multi-issue processor of claim 13, wherein the multi-issue processor is configured to execute an interrupt service routine, consisting of one or more instructions included in the second instruction set, in response to an interrupt signal.

15. The multi-issue processor of claim 14, wherein in response to the interrupt signal, the multi-issue processor is further configured to:
retrieve a data value from the register of the input routing network of the second set of one or more issue slots;
execute the interrupt service routine using only one or more of the functional units of the one of the second set of one or more issue slots; and
restore the register of the input routing network of the second set of one or more issue slots to the retrieved data value.

16. The multi-issue processor of claim 13, wherein each issue slot in the first set of one or more issue slots:
includes a holdable register on the respective output path coupled to each of the plurality of functional units; and
is configured to prevent switching of combinatorial gates of each respective one of the plurality of functional units by disabling the holdable register on the corresponding output path coupled to the respective one of the plurality of functional units.

17. A multi-issue processor of claim 13, wherein for each of the second set of issue slots the input routing network includes at least a second input path coupled to an instruction register, the at least second input path each including a register coupled to store data on the at least second input path.

* * * * *

UNITED STATES PATENT AND TRADEMARK OFFICE
CERTIFICATE OF CORRECTION

PATENT NO. : 8,095,780 B2
APPLICATION NO. : 10/511512
DATED : January 10, 2012
INVENTOR(S) : Leijten Page 1 of 1

It is certified that error appears in the above-identified patent and that said Letters Patent is hereby corrected as shown below:

Column 8, line 13, in Claim 13, delete "multi issue" and insert -- multi-issue --.

Column 8, line 18, in Claim 13, delete "multi issue" and insert -- multi-issue --.

Signed and Sealed this
Third Day of July, 2012

David J. Kappos
*Director of the United States Patent and Trademark Office*